United States Patent [19]

Raftis

[11] 3,749,115

[45] July 31, 1973

[54] DAMPER APPARATUS WITH FLUID SEAL

[75] Inventor: George Joseph Raftis, West Simsbury, Conn.

[73] Assignee: Combustion Engineering, Inc., Windsor, Conn.

[22] Filed: Dec. 29, 1971

[21] Appl. No.: 213,424

[52] U.S. Cl............. 137/246.22, 137/601, 251/306
[51] Int. Cl............................ F16k 1/22, F24f 13/16
[58] Field of Search................... 251/175, 305, 308; 137/246, 246.22, 601

[56] References Cited
UNITED STATES PATENTS

| | | | |
|---|---|---|---|
| 3,620,242 | 11/1971 | Pease | 251/306 |
| 1,990,309 | 2/1935 | Phillips | 137/246.22 |
| 3,426,507 | 2/1969 | Kossowski | 98/110 X |
| 3,532,321 | 10/1970 | Bowman | 251/306 X |

*Primary Examiner*—Martin P. Schwadron
*Assistant Examiner*—Richard Gerard
*Attorney*—Edlon H. Luther and John F. Carney

[57] ABSTRACT

Dampers operative in a duct system are provided with a hollow body that is connected to a source of fluid maintained at a higher pressure than that of the gases passed through the duct. Means are provided along the edges of the dampers to contain sealing fluid admitted thereto when the dampers are disposed in a fully closed position thus to provide a fluid seal that is effective to prevent passage of the gases conducted through the duct from one side of the dampers to the other.

5 Claims, 3 Drawing Figures

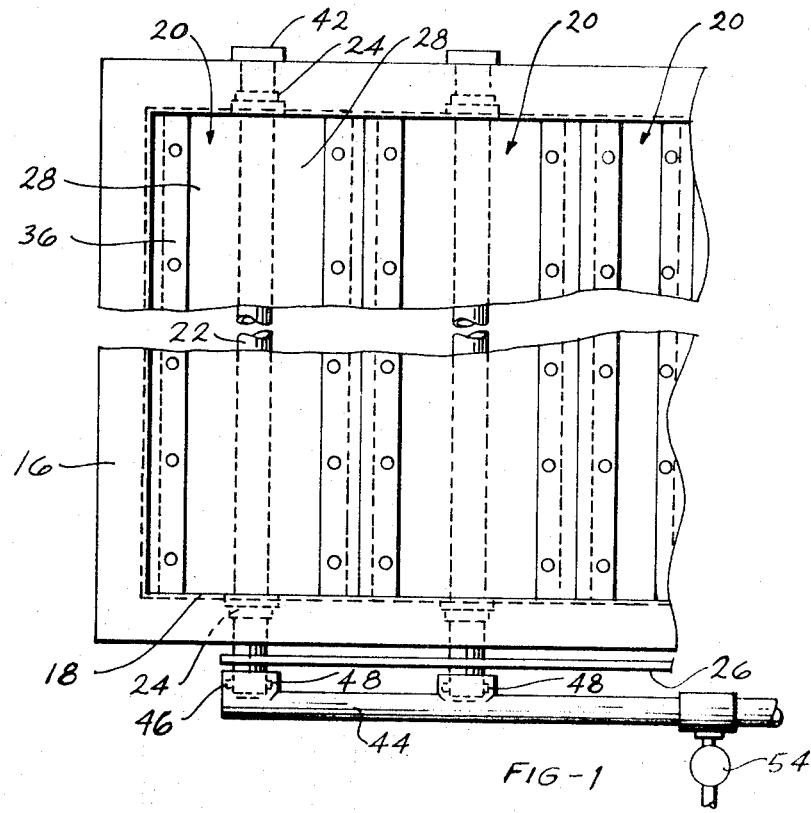
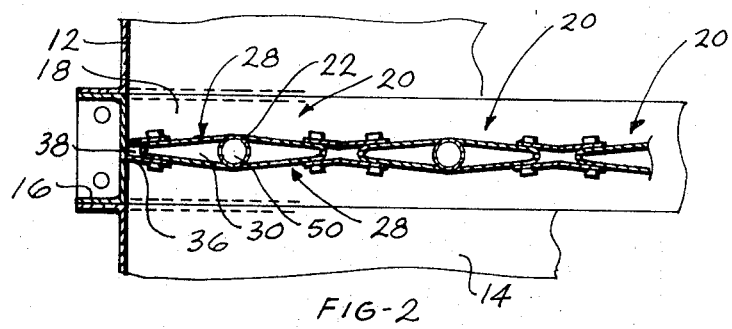
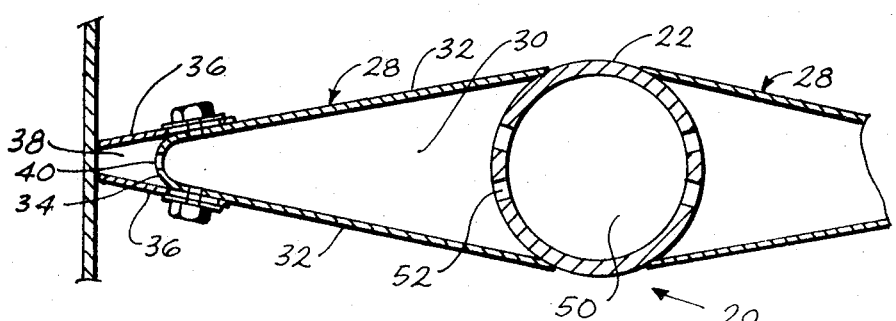

DAMPER APPARATUS WITH FLUID SEAL

BACKGROUND OF THE INVENTION

Industrial plants commonly employ ducts for conducting various types of gaseous fluids. Where it is desired to regulate or to terminate the flow of such fluids through a duct dampers are employed. In large ducts of extended lateral dimensions a plurality of aligned, mutually cooperating dampers are employed to close the duct passage. In actual practice a totally effective seal of the passage is not possible solely by means of a cooperation between adjacent dampers due to the difficulty in achieving a fluid tight metal-to-metal seal. This is caused principally by the fact that warpage of the members normally occurs when the dampers are disposed in a high temperature environment or particulate matter is deposited on the mating surfaces of adjacent members when they are disposed in an unclean atmosphere thereby preventing the mating surfaces from seating properly. In some applications, for example the combustion gas duct of vapor generators, a combination of both conditions prevails.

In order to overcome the above-mentioned problem it has been the practice to provide such combustion gas ducts with two longitudinally spaced rows of dampers and to inject a sealing fluid at a pressure higher than that of the gas being conducted by the duct into the space between the rows of dampers. In this way a positive fluid seal of the conducted gas is effected with the only leakage possible being that of the sealing fluid which, if it occurs, will pass upstream and/or downstream of the damper assembly.

Damper arrangements of the described type, while providing an effective seal, are expensive. The large number of dampers required to effect the seal due to the need of duplicate rows renders the cost excessive. The costs are magnified moreover, when the dampers employed are formed of a high cost alloy material.

SUMMARY OF THE INVENTION

According to the invention there is provided flow damper apparatus of relatively inexpensive construction that is effective to positively prevent prevent the flow of controlled gaseous fluid in a duct passage. The dampers are formed as hollow bodies and are connected to a source of sealing fluid. Oppositely spaced seal plates disposed along the edges of the damper bodies form spaces between adjacent dampers into which sealing fluid is directed thereby forming a fluid seal between the upstream and downstream sides of the damper apparatus.

It is therefore a general object of this invention to provide a damper apparatus capable of effectively sealing a duct passage against the flow of controlled gaseous fluid when the dampers are closed.

Another object of the invention is to provide apparatus requiring only a single row of dampers by means of which an effective fluid seal is obtained.

Yet another object of the invention is to provide damper apparatus of reduced cost compared to that previously required to positively seal a duct passage.

For a better understanding of the invention, its operating advantages and the specific objects obtained by its use, reference should be made to the accompanying drawings and description which relate to various embodiments of the invention.

DESCRIPTION OF THE DRAWINGS

FIG. 1 is a plan view of damper apparatus according to the present invention with the dampers shown in their closed position;

FIG. 2 is an elevational section of the damper apparatus of FIG. 1; and

FIG. 3 is an enlarged elevational section of a damper body constructed according to the invention.

DESCRIPTION OF THE PREFERRED EMBODIMENTS

The drawings illustrate damper apparatus, indicated generally as 10, that are applied to a duct 12 for the purpose of controlling the flow of fluids, combustion gas for example, through the passage 14 defined thereby.

The damper assembly includes a frame 16 constructed of rectangularly arranged structural members and interposed between adjacent sections of the duct 12. The frame 16 defines an opening 18 within which a plurality of damper bodies 20 are disposed in a manner by means of which the opening 18 can be controllably varied. The damper bodies 20 are mounted in the frame 16 by means of a pivoted support 22 that extends between opposite sides of the frame and is attached on each side by appropriate bearings 24 such that the damper bodies can be pivoted between open and closed positions by an operator mechanism 26. The flow of gas through the duct 12 is controlled by the extent to which the damper bodies 20 are oriented with respect to their open or closed positions. When the damper bodies 20 are in a full open position they are disposed in a substantial vertical orientation, being parallel to one another and to the longitudinal axis of the duct. When the damper bodies are closed they are disposed in horizontal, end-to-end alignment across the section of the duct as shown in FIG. 2. With the damper bodies in this position there can be no flow of conducted fluid through the duct 12.

According to the invention the damper bodies 20 having oppositely extending arms 28 are formed by sheet metal casing attaced to the external surface of the pivotal support 22. The casing defines a hollow member having an interior chamber 30 possessing converging sides 32 that are integrally joined at an apex 34. Mounted along the sides 32 of each of the arms 28 are oppositely spaced, longitudinally extending seal plates 36. The seal plates 36 may be adjustably attached to the casing sides 32 as by means of stud and slot connections in order to permit the clearance between the edges of adjacent damper bodies to be adjusted during their assembly. As shown, the seal plates 36 extend outwardly beyond the apex 34 of each arm 28 and define a space 38 therebetween. This space 38 is placed in fluid communication with the interior chamber 30 of the damper body by means of a plurality of longitudinally spaced openings 40 in the casing forming the apex 34.

The pivot supports 22 are hollow cylindrical members having one of their ends closed by caps 42. At the other end the supports communicate with a manifold pipe 44 that is connected to a source of sealing fluid, preferrably air, maintained at a pressure higher than that of the combustion gas flowing through the duct 12. The ends of the supports 22 are received in the manifold pipe 44 in the receptacles 46 having O-ring seals 48 by means of which the supports can undergo pivotal movement within the latter under the action of the operator mechanism 26. The interior of the support 22 forms a flow passage 50 that communicates with the interior chambers 30 of the damper bodies by means of openings 52 placed at axially spaced locations along the length of the supports. By means of this arrangement therefore, sealing fluid can be delivered to the spaces 38 between the edges of adjacent damper through the flow passages 50 and interior chambers 30 of the damper bodies. Appropriate valving as indicated at 54 is provided to initiate the flow of sealing fluid only when the damper bodies 20 are disposed in their closed positions as shown in FIG. 2.

The operation of the hereindescribed damper apparatus is as follows. The duct 12 is considered to be in its full open position when the damper bodies 20 are disposed substantially parallel to the longitudinal axis of the duct. When the dampers are in this position and in all intermediate positions between their full open position and full closed position, the sealing fluid valve 54 is closed and no sealing fluid is caused to flow through the apparatus. When, however, the dampers are in their fully closed position, i.e., horizontally disposed with the apices 34 of the respective damper bodies in end-to-end alignment as illustrated in FIG. 2, the spaces 38 formed by the seal plates 36 on adjacent dampers are disposed in mutual communication and the valve 54 is opened to cause sealing fluid to pass through the respective damper bodies 20 to the spaces 38. Because the fluid admitted to the spaces 38 is at a somewhat higher pressure than that of the gas flowing through the duct 12, the only flow permitted to occur through the seams defined between the adjacent damper bodies would be that of the sealing fluid which would pass to both of the upstream and downstream sides of the damper assembly. No passage of the controlled fluid could occur through the plane of the dampers.

The present invention therefore provides a simple, inexpensive means for sealing a gas duct. The duplicate rows of dampers required in prior art apparatus are eliminated and only a single row is necessary to effectively prevent gas flow through the duct. Thus, a positive seal is provided by the utilization of only a portion of the structure and at fraction of the cost of comparable prior art equipment.

It will be understood that various changes in the details, materials, and arrangements of parts which have been hereindescribed and illustrated in order to explain the nature of the invention, may be made by those skilled in the art within the principle and scope of the invention as expressed in the appended claims.

What is claimed is:

1. In a duct system for conducting fluids, the combination comprising:
   a. a frame defining an opening for the passage of fluids therethrough;
   b. a plurality of hollow damper bodies journaled for pivotal movement in said frame between an open and a closed position;
   c. said damper bodies in said closed position being disposed with the edges of adjacent damper bodies in slightly spaced lateral end-to-end alignment across the width of said frame opening;
   d. a source of sealing fluid maintained at a pressure greater than that of the fluids conducted through said duct system;
   e. means for connecting the interior of said damper bodies to said sealing fluid source; and
   f. means for discharging said sealing fluid from the interior of said damper bodies to the spaces between adjacent damper bodies when the same are in their closed position.

2. The combination of claim 1 wherein said damper bodies each comprise a sheet material casing defining a member having oppositely extending arms terminating in end edges extending from the longitudinal axis thereof, the end edges of adjacent damper bodies being disposed in substantial end-to-end alignment when said damper bodies are in their closed positions, and said sealing fluid discharge means includes means forming openings spaced along said end edges.

3. The combination of claim 2 including oppositely spaced seal plates substantially coextensive with said end edges, said seal plates defining a space into which said sealing fluid is discharged.

4. The combination of claim 3 wherein said seal plates are laterally adjustable with respect to said edges.

5. The combination of claim 2 wherein the connection of the interior of said damper bodies to said sealing fluid source is effected by a damper support formed of a hollow member extending into each of said damper bodies, said damper support being journaled for pivotal movement at each end in said frame, one of said ends connecting with said sealing fluid source, and means in said support placing the interior of said member in fluid communication with the interior of said damper body.

* * * * *